(12) United States Patent
Tsai

(10) Patent No.: US 11,187,893 B2
(45) Date of Patent: Nov. 30, 2021

(54) LICENSE PLATE CAPTURING DEVICE AND METHOD FOR REMOVING TARGET COVERING LICENSE PLATE CAPTURING DEVICE

(71) Applicant: Getac Technology Corporation, Hsinchu County (TW)

(72) Inventor: Kun-Yu Tsai, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 160 days.

(21) Appl. No.: 16/165,008

(22) Filed: Oct. 19, 2018

(65) Prior Publication Data

US 2020/0124842 A1 Apr. 23, 2020

(51) Int. Cl.
*G02B 27/00* (2006.01)
*H04N 5/225* (2006.01)

(52) U.S. Cl.
CPC ........ *G02B 27/0006* (2013.01); *H04N 5/2252* (2013.01); *H04N 5/2256* (2013.01)

(58) Field of Classification Search
CPC ...... H04N 5/2252; H04N 5/2256; H04N 5/33; G02B 27/0006; G02B 13/14; B60R 11/04; B60R 2011/004; B60R 21/01538; B60S 1/56; B60S 1/0848; B60S 1/026; B60S 1/0844; B60S 1/485
USPC ........................................................ 359/512
See application file for complete search history.

(56) References Cited

U.S. PATENT DOCUMENTS

| 7,783,400 B1* | 8/2010 | Zimler | B60S 1/0866 701/36 |
| 7,825,829 B2* | 11/2010 | Madsen | H04N 5/232 340/937 |
| 2015/0254914 A1* | 9/2015 | Harucksteiner | G07B 15/04 348/156 |
| 2017/0096144 A1* | 4/2017 | Elie | G06K 9/2018 |

FOREIGN PATENT DOCUMENTS

CN          103777439 A    5/2014

OTHER PUBLICATIONS

CN OA 201810900883.X dated Oct. 9, 2020.

* cited by examiner

*Primary Examiner* — Jade R Chwasz
(74) *Attorney, Agent, or Firm* — Locke Lord LLP; Tim Tingkang Xia, Esq.

(57) ABSTRACT

A license plate capturing device includes an image capturing unit, a plurality of infrared light emitting units, a driving circuit and a control circuit. The plurality of infrared light emitting units is located around the image capturing unit. Each of the infrared light emitting units emits invisible light having a predetermined wavelength that has an absorption band of a target. The driving circuit is coupled to the infrared light emitting units. The control circuit is coupled to the driving circuit and the image capturing unit, and controls the driving circuit to execute one of a normal driving mode and a continuous driving mode. In the continuous driving mode, the driving circuit continuously provides a driving current to the infrared light emitting units for a continuous period of time so as to remove a target covering the license plate capturing device.

11 Claims, 4 Drawing Sheets

LICENSE PLATE CAPTURING DEVICE AND METHOD FOR REMOVING TARGET COVERING LICENSE PLATE CAPTURING DEVICE

BACKGROUND OF THE INVENTION

Field of the Invention

The present invention relates to a license plate capturing device and, more particularly, to a license plate capturing device and a method for removing a target covering the license plate capturing device.

Description of the Prior Art

Camera devices deployed outdoors frequently need to face tests of harsh weather and environmental conditions. In particular, ice and frost are often formed on a smooth surface of a camera lens in a country located at high latitude, whereas fog occurs thereon in a humid country, resulting in the covered camera lens and failure in capturing images.

Some outdoor camera devices are provided with additional heating elements with the aim of removing ice, frost or fog by direct heating. However, on top of increased production costs of the additional heating elements, the image capturing effects may become unsatisfactory if a lens is blocked by the heating elements. Furthermore, the temperature of the device is also caused to rise during heating, resulting in undesired effects on other components in the device and thus accelerating the aging and damage of the components instead.

SUMMARY OF THE INVENTION

In view of the above, the present invention provides a license plate capturing device and a method for removing a target covering the license plate capturing device which achieve functions of de-icing, defrosting and defogging by using a light filling element (infrared light emitting units) of the device, thereby effectively saving production costs without generating excessive heat energy that affects other components.

In one embodiment, a license plate capturing device includes an image capturing unit, a plurality of infrared light emitting units, a driving circuit and a control circuit. The plurality of infrared light emitting units is located around the image capturing unit. Each of the infrared light emitting units transmits invisible light having a predetermined wavelength that has an absorption band of a target. The driving circuit is coupled to the infrared light emitting units. The control unit is coupled to the driving circuit and the image capturing unit, and controls the driving circuit to execute one of a normal driving mode and a continuous driving mode. In the continuous driving mode, the driving circuit continuously provides a driving current to the infrared light emitting units for a continuous period of time.

In one embodiment, a method for removing a target covering a license capturing device includes receiving a continuous activation signal, entering a continuous driving mode in response to the continuous activation signal, driving a driving circuit in the continuous driving mode to continuously provide a driving current to a plurality of infrared light emitting units for a continuous period of time, and entering a normal driving mode after the continuous period of time ends. When the driving current is continuously provided, the infrared light emitting units continuously emit invisible light having a predetermined wavelength that has an absorption band of the target.

In conclusion, in a license plate capturing device and a method for removing a target covering the license plate capturing device according to an embodiment of the present invention, infrared light in regard to an absorption band of the target is emitted by infrared light emitting units having an appropriate wavelength, so as to remove the target covering the license plate capturing device without affecting other elements and involving no additional electric heating elements, thus achieving preferred image capturing effects. In some embodiments, the license plate capturing device is capable of activating different types of continuous driving modes according to user requirements, further achieving optimal effects of removing the target.

DETAILED DESCRIPTION OF THE EMBODIMENTS

Figure 1:
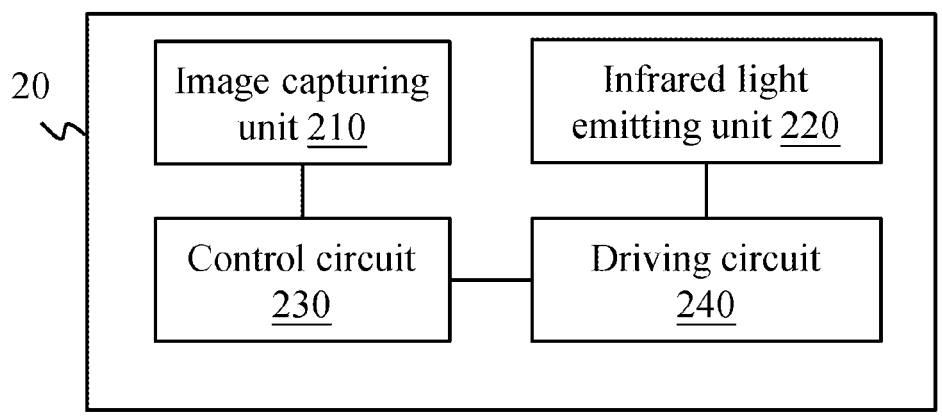
FIG. 1 is a system block diagram of a license plate capturing device according to an embodiment of the present invention.

FIG. 1 shows a system block diagram of a license plate capturing device according to an embodiment of the present invention. Referring to FIG. 1, the license plate capturing device 20 includes an image capturing unit 210, a plurality of infrared light emitting units 220, a control circuit 230 and a driving circuit 240. The image capturing unit 210 and the driving circuit 240 are coupled to the control circuit 230. The driving circuit 240 is coupled to the plurality of infrared light emitting units 220 which are provided around the image capturing unit 210. The driving circuit 240 provides the infrared light emitting units 220 with a driving current so as to drive the infrared light emitting units 220 to emit invisible light.

The control circuit 230 controls the driving circuit 240 to execute a normal driving mode. In normal circumstances, the image capturing unit 210 is activated to capture an image of an object to be captured (e.g., a license plate). When the image capturing unit 210 captures an image of the object to be captured, the driving circuit 240 drives the infrared light emitting units 220 by the normal driving mode to cause the infrared light emitting units 220 to emit invisible light having a predetermined wavelength, thereby providing the object to be captured with an auxiliary light source. After the image capturing unit 210 completes image capturing, the driving circuit 240 also stops driving the infrared light emitting units 220. In some embodiments, in the normal driving mode, the driving current generated by the driving circuit 240 is intermittently provided to the infrared light emitting units 220 during the period in which the image capturing unit 210 captures the image of the object to be captured, such that the infrared light emitting units 220 repeatedly emit the invisible light for shorter periods of time. In some embodiments, the image capturing unit 210 includes a black and white capturing module, and the predetermined wavelength of the invisible light includes a reflection band of the object to the captured.

For example, when the black and white capturing module of the license plate capturing module 20 is going to acquire an image of a license plate of a vehicle, the infrared light emitting units 220 emit infrared light including a reflection band of the license plate, thus acquiring a clearer image of the license plate.

When the control circuit 230 controls the driving circuit 240 to execute the continuous driving mode, the driving circuit 240 continuously provides a driving current to the infrared light emitting units 220 for a continuous period of time. In other words, the infrared light emitting units 220 are continuously activated for a continuous period of time. At this point in time, the predetermined wavelength of the invisible light emitted by the infrared light emitting units 220 also corresponds to an absorption band of a target 10 (see FIG. 6). In some embodiments, the length of the continuous period of time may be adjusted according to the intensity of the infrared light emitting units 220 in the continuous driving mode. In some embodiments, the length of the continuous period of time may be three to ten minutes; preferably, the length of the continuous period of time may be five minutes. In some embodiments, in the continuous driving mode, the image capturing unit 210 does not operate.

For example, when the license plate capturing device 20 needs to remove ice, frost or fog (the target 10), the infrared light emitting units 220 continuously emit invisible light having a predetermined wavelength, wherein the wavelength of the invisible light corresponds to an absorption band of liquid water, ice or the combination thereof (the target 10). Thus, the ice, frost or fog covering the license plate capturing device 20, after having absorbed the energy provided by the infrared light, becomes melted or evaporated, and thereby achieving the object of removing the target 10.

In some embodiments, in the normal driving mode, the infrared light emitting units 220 adopt a short-period (e.g., 0.1 second) activated state. In the continuous driving mode, the infrared light emitting units 220 adopt a long-period (e.g., five minutes) activated state. Furthermore, the infrared light emitting units 220 may adopt the same intensity (e.g., 30 to 40 watts) in these two modes. In some embodiments, the infrared light emitting units 220 may also adopt different intensities in these two modes. In the normal driving mode, the infrared light emitting units 220 may be in a high-intensity (e.g., 96 watts) and short-period (e.g., 0.1 second) activated state. In the continuous driving mode, the infrared light emitting units 220 may be in a low-intensity (e.g., 30 to 40 watts) and long-period (e.g., five minutes) activated state. The term "intensity" refers to a total intensity of all of the activated infrared light emitting units 220.

The invisible light having the predetermined wavelength emitted by the infrared light emitting units 220 refers to infrared light. In some embodiments, the predetermined wavelength is selected as a wavelength having a preferred absorption band in regard to the target 10 and also a reflection band of the object to be captured. In some embodiments, the predetermined wavelength may be between 750 nm and 1,100 nm. Preferably, the predetermined wavelength may be 850 nm or 940 nm.

In some embodiments, the infrared light emitting units 220 may be implemented by light emitting diodes (LEDs). In some embodiments, a part or all of the plurality of infrared light emitting units 220 may be activated according to the required intensity.

In some embodiments, in the normal driving mode, the driving circuit 240 provides the driving current to all of the infrared light emitting units 220 to activate all of the infrared light emitting units 220, so as to achieve short-period and one-time emission of high-intensity infrared light. In the continuous driving mode, the driving circuit 240 provides the same driving current as that in the normal driving mode to a part of the infrared light emitting units 220, or provides a driving current smaller than that in the normal driving mode to all of the infrared light emitting units 220 in order to have the infrared light emitting units 220 to emit infrared light having a lower intensity for a longer period of time, thus preventing an overly high driving current provided for an extended period of time from causing circuit malfunction or reducing the durability of the infrared light emitting units 220.

Figure 2:
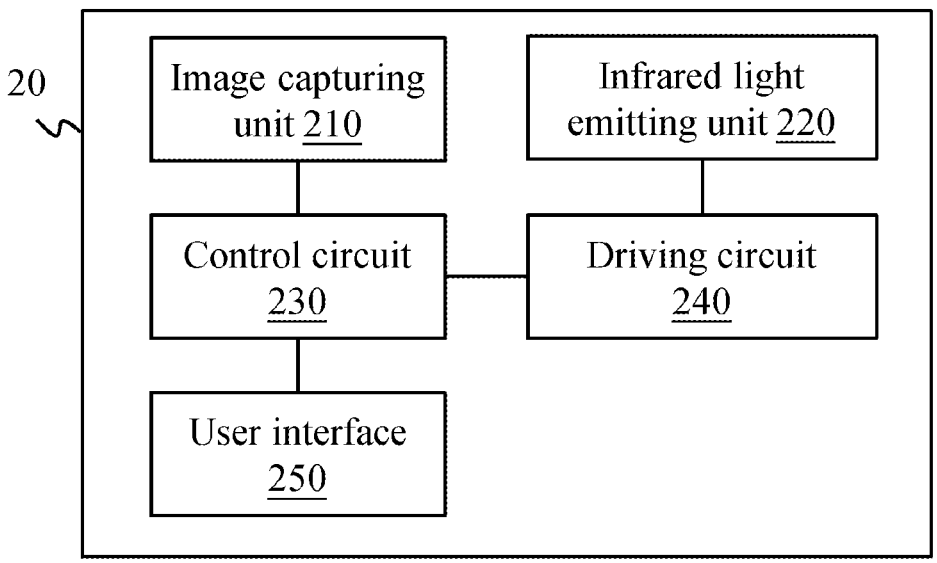
FIG. 2 is a system block diagram of a license plate capturing device according to another embodiment of the present invention.

In some embodiments, referring to FIG. 2, the license plate capturing device 20 further includes a user interface 250 that is coupled to the control circuit 230. The user interface 250 includes a plurality of options each corresponding to different driving current amounts and different continuous periods of time. For example, option one is a normal driving mode, option two is a first continuous driving mode (e.g., activated at 30 to 40 watts for five minutes), and option three is a second continuous driving mode (e.g., activated at 50 to 60 watts for six minutes). When the user interface 250 receives a selection signal of one of the above options, the control circuit 230 controls the driving circuit 240 according to the selection signal to provide a driving current having a corresponding driving current amount to the infrared light emitting units 220. In other words, the infrared light emitting units 220 provides infrared light of different intensities for continuous periods of time of different lengths according to the driving current amounts provided by the different options and the continuous periods of time defined by the different options. In some embodiments, the user interface 250 may be provided on a housing of the license plate capturing device 20 or be installed on a carrier of the license plate capturing device 20. In some embodiments, the user interface 250 may be realized by a rotating disc, a switch, a button, a touch screen, a voice control instruction or a motion detection. In some embodiments, the user interface 250 includes a wireless signal transmitter. In other words, the user interface 250 is coupled to the control circuit 230 by wireless signals, and transmits the generated selection signal by a wireless signal transmitter. The control circuit 230 then receives the selection signal by a wireless signal receiver and accordingly performs the subsequent control operation.

Figure 3:
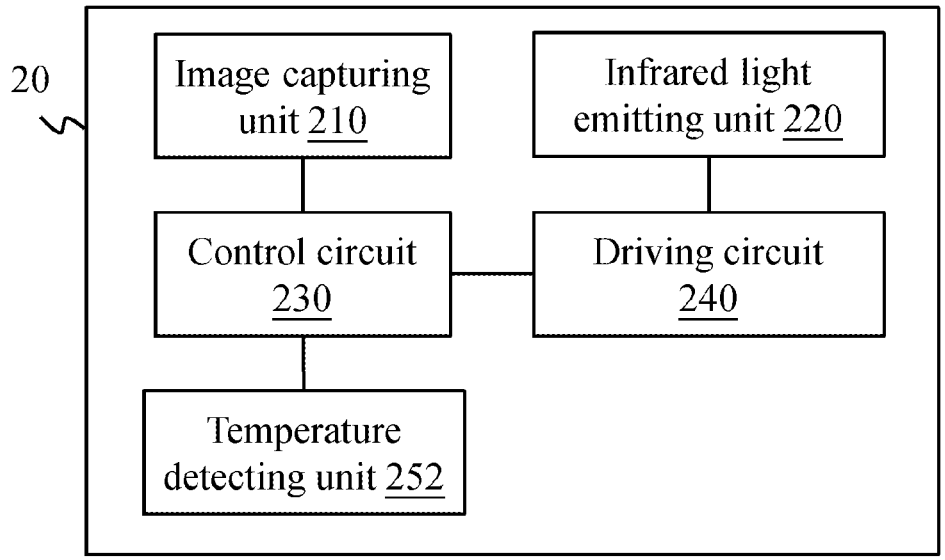
FIG. 3 is a system block diagram of a license plate capturing device according to yet another embodiment of the present invention.

In some embodiments, referring to FIG. 3, the license plate capturing device 20 may further include a temperature detecting unit 252 that is coupled to the control circuit 230. The temperature detecting unit 252 obtains an environment temperature value and provides the environment temperature value to the control circuit 230. The control circuit 230 determines whether the environment temperature value is lower than a set temperature value. If the environment temperature value is lower than the set temperature value, the control circuit 230 sends a continuous activation signal to the driving circuit 240; that is, the control circuit 230 controls the driving circuit 240 by a continuous activation signal to cause the driving circuit 240 to continuously provide a driving current having a corresponding driving current amount to the infrared light emitting units 220 for a corresponding continuous period of time, otherwise the control circuit 230 does not send the continuous activation signal.

Figure 4:
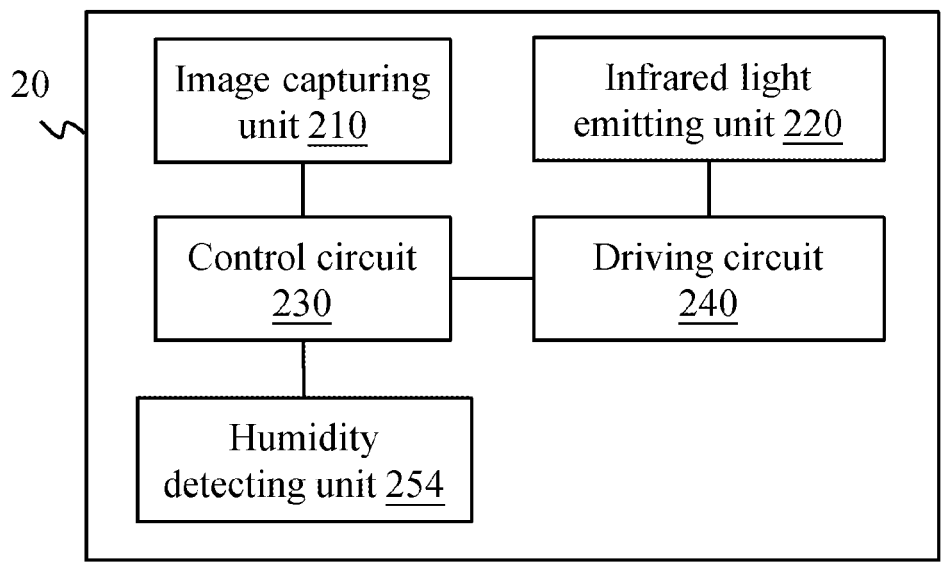
FIG. 4 is a system block diagram of a license plate capturing device according to a further embodiment of the present invention.

In some embodiments, referring to FIG. 4, the license plate capturing device 20 may further include a humidity detecting unit 254 that is coupled to the control circuit 230. The humidity detecting unit 254 obtains an environment humidity value and provides the environment humidity value to the control circuit 230. The control circuit 230 determines whether the environment humidity value is higher than a set humidity value. If the environment humidity value is higher than the set humidity value, the control circuit 230 sends a continuous activation signal to the driving circuit 240; that is, the control circuit 230 controls the driving circuit 240 by a continuous activation signal to cause the driving circuit 240 to continuously provide a driving current having a corresponding driving current amount to the infrared light emitting units 220 for a corresponding continuous period of time, otherwise the control circuit 230 does not send the continuous activation signal.

Figure 5:
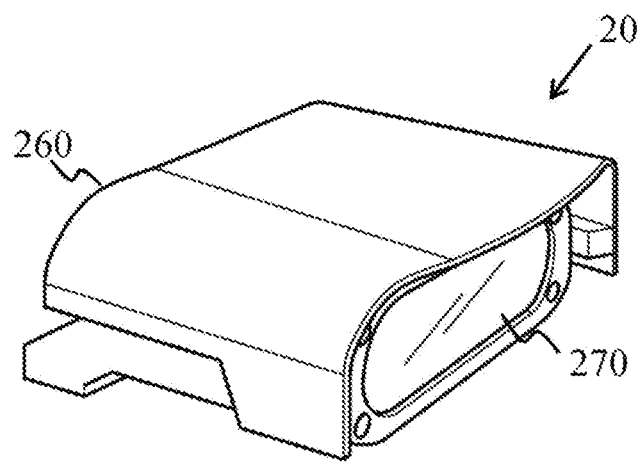
FIG. 5 is a schematic diagram of the appearance of a license plate capturing device according to an embodiment of the present invention.
Figure 6:
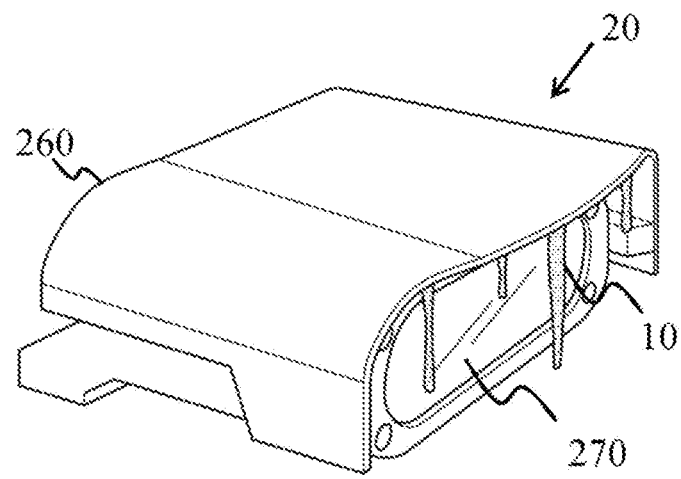
FIG. 6 is a schematic diagram of a license plate capturing device and a target covering thereon according to an embodiment of the present invention.

FIG. 5 shows a schematic diagram of the appearance of a license plate capturing device according to an embodiment of the present invention. FIG. 6 is a schematic diagram of a license plate capturing device and a target covering thereon according to an embodiment of the present invention. In some embodiments, referring to FIG. 5 and FIG. 6, the license plate capturing device 20 further includes a housing 260 and a transparent cover 270. The image capturing unit 210, the infrared light emitting units 220, the driving circuit 240 and the control circuit 230 of the license plate capturing device 20 are placed inside the housing 260 (not shown). In some embodiments, the plurality of infrared light emitting units 220 are provided around (encircling) the image capturing unit 210. In some embodiments, the infrared light emitting units 220 are, for example, 10 to 16 infrared LEDs. In some embodiments, the infrared light emitting units 220 are, for example, 14 infrared LEDs.

In some embodiments, the transparent cover 270 is configured on the housing 260, and the infrared light emitting units 220 can emit invisible light having a predetermined wavelength directly towards the transparent cover 270. At this point in time, the invisible light emitted passes through the transparent cover 270 and irradiates the target 10 or the object to be captured. At this point in time, the housing 260 and the transparent cover 270 form a sealed space, so as to prevent the invasion of the target 10 and hence from damage of the license plate capturing device 20.

In some embodiments, the target 10 is non-normally located outside the transparent cover 270, as shown in FIG. 6. At this point in time, the infrared light emitting units 220 can continuously emit invisible light having a predetermined wavelength directly towards the transparent cover 270 to remove the target 10.

In some embodiments, the transparent cover 270 is made by a material passable by infrared light. For example, the transparent cover 270 may be a glass cover, a plastic cover or a quartz cover. That is to say, directly irradiating the target 10 by the invisible light emitted by the infrared light emitting units 220 can avoid the image capturing unit 210 from generating an excessively high temperature and thus from reduced durability. In some embodiments, the continuous period of time may be five minutes.

Figure 7:
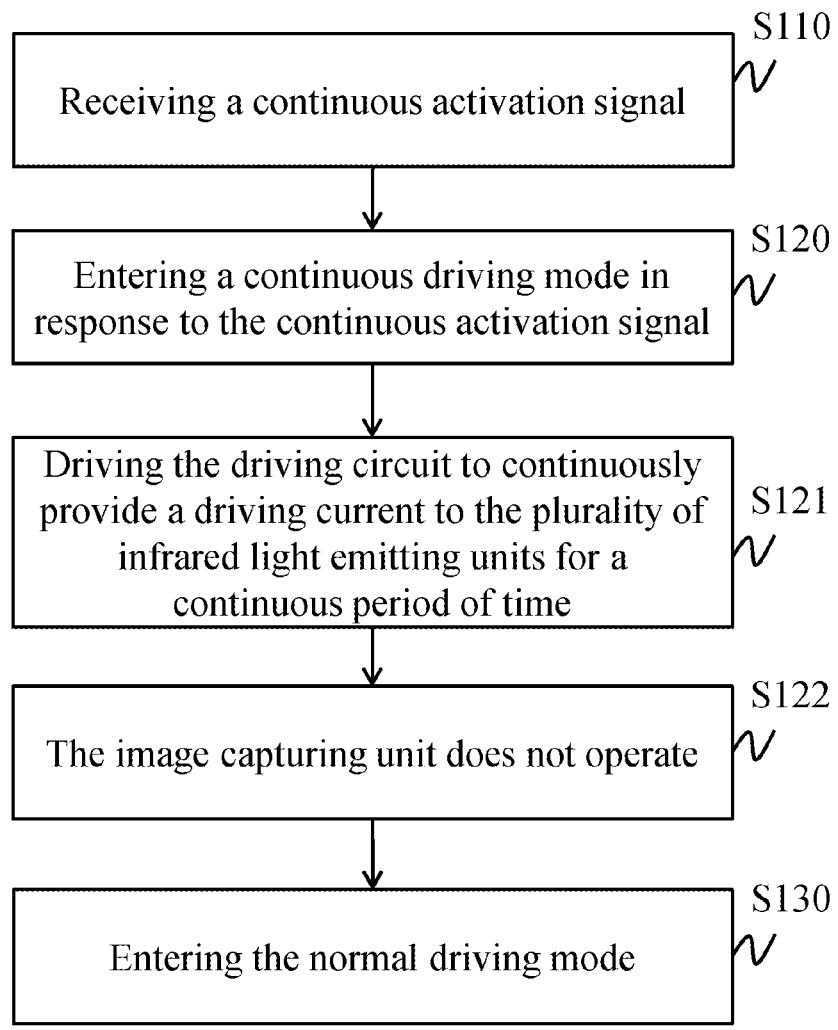
FIG. 7 is a flowchart of a method for removing a target covering a license plate capturing device according to an embodiment of the present invention.

FIG. 7 shows a flowchart of a method for removing a target covering a license plate capturing device according to an embodiment of the present invention.

Referring to FIG. 7, the license plate capturing device 20 receives a continuous activation signal (step S110).

In some embodiments of the step S110, the control circuit 230 of the license plate capturing device 20 receives a selection signal from the user interface 250, and sends the selection signal as a continuous activation signal to the driving circuit 240.

In some other embodiments of the step S110, the license plate capturing device 20 further uses the temperature detecting unit 252 to obtain an environment temperature value, and the control circuit 230 determines whether the environment temperature value is lower than a set temperature value. The control circuit 230 sends the continuous activation signal to the driving circuit 240 if the environment temperature value is lower than the set temperature value, otherwise the control circuit 230 does not send the continuous activation signal.

In yet some other embodiments of the step S110, the license plate capturing device 20 further uses the humidity detecting unit 254 to obtain an environment humidity value, and the control circuit 230 determines whether the environment humidity value is higher than a set humidity value. The control circuit 230 sends the continuous activation signal to the driving circuit 240 if the environment humidity value is higher than the set humidity value, otherwise the control circuit 230 does not send the continuous activation signal.

In some further embodiments of the step S110, when the image capturing unit 210 performs image capturing, the control circuit 230 determines whether the captured image of the object to be captured is clear, and sends the continuous activation signal to the driving circuit 240 when the captured image of the object to be captured is determined as blurry.

Next, the driving circuit 240 of the license plate capturing device 20 enters a continuous driving mode in response to the continuous activation signal (step S120). In the continuous driving mode, the control circuit 230 of the license plate capturing device 20 controls the driving circuit 240 to continuously provide a driving current to the plurality of infrared light emitting units 220 for a continuous period of time (step S121), so as to drive the infrared light emitting units 220 to emit invisible light having a predetermined wavelength for a continuous period of time. At time point in time, the predetermined wavelength has an absorption band of the target 10. In some embodiments, the continuous period of time may be five minutes. In some embodiments, the target 10 may be liquid water, ice or the combination thereof. In some embodiments, the predetermined wavelength may be 850 nm or 940 nm.

In some embodiments, in the continuous driving mode, the image capturing unit 210 does not operate (step S122). The image capturing unit 210 is enabled only in the normal driving mode, thus reducing the power consumption and prolonging the durability thereof.

After the driving current is continuously provided for the continuous period of time (step S120), the driving circuit 240 of the license plate capturing device 20 enters the normal driving mode (step S130). That is to say, after the target 10 covering the license plate capturing device 20 is removed, normal operation is restored. In the normal driving mode, the control circuit 230 of the license plate capturing device 20 controls in conjunction with the operation of the image capturing unit 210 the driving circuit 240, to provide the driving current to the plurality of infrared light emitting units 220 for a time length corresponding to the continuous driving mode. At this point in time, the infrared light emitting units 220 emit invisible light having a reflection band of the object to be captured.

In some embodiments, the control circuit 230 may be implemented by one or more processing elements. The processing elements may be microprocessors, microcontrollers, digital signal processors, central processors, programmable logic controllers, state machines or any other analog and/or digital devices operating signals on the basis of an operation instruction.

In some embodiments, the image capturing unit 120 may be implemented by a camera lens, a photosensing unit and an image processing unit. In an exemplary embodiment, the image capturing unit 210 may be an image signal processor (ISP). In another exemplary embodiment, the image capturing unit 210 and the control circuit 230 are implemented by the same chip.

It should be noted that, although the steps are described in the foregoing sequence, the orders of the steps in the sequence are not to be construed as a limitation to the present invention. A person skilled in the art can understand that, the orders for executing some of the steps can be simultaneous or be exchanged in reasonable conditions.

In conclusion, in a license plate capturing device and a method for removing a target covering the license plate capturing device according to an embodiment of the present invention, infrared light in regard to an absorption band of the target 10 is emitted by the infrared light emitting units 220 having an appropriate wavelength, so as to remove the target 10 covering the license plate capturing device 20 without affecting other elements and involving no additional electric heating elements, thus achieving preferred image capturing effects. In some embodiments, the license plate capturing device 20 is capable of activating different types of continuous driving modes according to user requirements, further achieving optimal effects of removing the target 10.

While the technical contents of the present invention have been disclosed by way of the preferred embodiments, it is to be understood that the present invention is not limited thereto. Various modifications and variations made by a person skilled in the art without departing from the spirit of the present invention are encompassed within the scope of the present invention, and the scope of patent protection of the present invention therefore should be accorded with the broadest interpretation of the appended claims.

What is claimed is:

1. A license plate capturing device, comprising:
   at least one image capturing unit configured to capture an image of an object to be captured, wherein the object to be captured is a license plate of a vehicle;
   a plurality of infrared light emitting units, located around the at least one image capturing unit, each of the plurality of infrared light emitting units for emitting invisible light having a predetermined wavelength, wherein the predetermined wavelength has an absorption band of at least one target covering the license plate capturing device and a reflection band of the license plate of the vehicle;
   a driving circuit, coupled to the plurality of infrared light emitting units;
   a detecting unit, for obtaining an environment value, wherein the detecting unit is a humidity detecting unit, and the environmental value is an environment humidity value; and
   a control circuit, coupled to the driving circuit, the detecting unit and the at least one image capturing unit, controlling the driving circuit to execute one of a normal driving mode and a continuous driving mode based on a comparison between the environmental value and a preset threshold value, wherein the preset threshold value is a preset humidity value, the control circuit controls the driving circuit to execute the continuous driving mode in response to determining that the environment humidity value is higher than the preset humidity value, and the driving circuit continuously provides a driving current to the plurality of infrared light emitting units for a continuous period of time in the continuous driving mode.

2. The license plate capturing device according to claim 1, wherein the continuous period of time is five minutes.

3. The license plate capturing device according to claim 1, wherein the at least one target is liquid water, ice, or the combination thereof.

4. The license plate capturing device according to claim 1, wherein the predetermined wavelength is 850 nm or 940 nm.

5. The license plate capturing device according to claim 1, further comprising:
   a user interface, providing a plurality of options, each of which corresponds to a driving current amount;
   wherein, when the user interface receives a selection signal of one of the options, the control circuit controls the driving circuit according to the selection signal to provide the driving current having the corresponding driving current amount to the plurality of infrared light emitting units.

6. The license plate capturing device according to claim 1, further comprising:
   a housing, in which the at least one image capturing unit, the plurality of infrared light emitting units, the driving circuit and the control circuit are accommodated; and
   a transparent cover, configured on the housing, wherein the invisible light having the predetermined wavelength emitted by the plurality of infrared light emitting units passes the transparent cover and irradiates the at least one target.

7. A method for removing a target covering a license plate capturing device, comprising:
   obtaining, by a detecting unit of the license plate capturing device, an environment value, wherein the detecting unit is a humidity detecting unit, and the environmental value is an environment humidity value;
   determining, by a control circuit of the license plate capturing device, whether a continuous driving mode is to be entered based on a comparison between the environmental value and a preset threshold value, wherein the preset threshold value is a preset humidity value, the control circuit is coupled to at least one image capturing unit, the detecting unit and a driving circuit of the license plate capturing device, the at least one image capturing unit is configured to capture an image of an object to be captured, and the object to be captured is a license plate of a vehicle;
   generating, by the control circuit, a continuous activation signal in response to determining that the continuous driving mode is to be entered, wherein the control circuit determines the continuous driving mode is to be entered in response to determining that the environment humidity value is higher than the preset humidity value;
   receiving, by the driving circuit from the control circuit, the continuous activation signal;

entering, by the driving circuit, the continuous driving mode in response to the continuous activation signal;

in the continuous driving mode, continuously providing a driving current to a plurality of infrared light emitting units for a continuous period of time by the driving circuit to drive the plurality of infrared light emitting units to emit invisible light having a predetermined wavelength, wherein the predetermined wavelength comprises an absorption band of at least one target covering the license plate capturing device and a reflection band of the license plate of the vehicle; and entering, by the driving circuit, a normal driving mode after the continuous period of time ends.

8. The method for removing a target covering a license plate capturing device according to claim 7, wherein the continuous period of time is five minutes.

9. The method for removing a target covering a license plate capturing device according to claim 7, wherein the at least one target is liquid water, ice, or the combination thereof.

10. The method for removing a target covering a license plate capturing device according to claim 7, wherein the predetermined wavelength is 850 nm or 940 nm.

11. The method for removing a target covering a license plate capturing device according to claim 7, wherein the at least one image capturing unit does not operate in the continuous driving mode.

* * * * *